United States Patent [19]

Morley

[11] Patent Number: 5,352,877
[45] Date of Patent: Oct. 4, 1994

[54] NON-CONTACT TRANSACTION SYSTEM WITH TOKEN PRESENCE DETECTION

[75] Inventor: Julian D. Morley, Hyde, United Kingdom

[73] Assignee: W. & T. Avery Limited, West Midlands, United Kingdom

[21] Appl. No.: 860,720

[22] Filed: Mar. 31, 1992

Related U.S. Application Data

[63] Continuation of Ser. No. 501,765, Mar. 30, 1990, abandoned.

[51] Int. Cl.$^5$ .............................................. G06K 7/08
[52] U.S. Cl. ................................................ 235/439
[58] Field of Search ............... 235/380, 381, 439, 449, 235/492; 340/825.54; 178/45, 64, 79

[56] References Cited

U.S. PATENT DOCUMENTS

| | | | |
|---|---|---|---|
| 4,870,419 | 9/1989 | Baldwin et al. | 342/50 |
| 4,899,036 | 2/1990 | McCrindle | 235/380 |
| 5,164,732 | 11/1992 | Brockelsby et al. | 342/44 |
| 5,235,326 | 8/1993 | Beigel et al. | 340/825.54 |

FOREIGN PATENT DOCUMENTS

| | | |
|---|---|---|
| 0147099 | 7/1985 | European Pat. Off. . |
| 2600448 | 12/1987 | France . |
| 2208025 | 2/1989 | United Kingdom . |

*Primary Examiner*—Davis L. Willis
*Assistant Examiner*—Edward Sikorski
*Attorney, Agent, or Firm*—Spencer, Frank & Schneider

[57] ABSTRACT

A transaction system includes a portable electronic token and an external read/write unit which communicate by inductive coupling. The read/write unit transmits short pulses of an r.f. carrier when in its dormant or stand-by mode and, upon detecting the presence of a token, switches its r.f. on continuously to power up the token and conduct a transaction. Thus, the system conserves power but can react rapidly when a transaction is necessary.

9 Claims, 4 Drawing Sheets

NON-CONTACT TRANSACTION SYSTEM WITH TOKEN PRESENCE DETECTION

TRANSACTION SYSTEM

This is a continuation of co-pending application Ser. No. 07/501,765, filed Mar. 30, 1990 now abandoned.

BACKGROUND OF THE INVENTION

1. Field of the Invention

This invention relates to a transaction system, and in particular it relates to a system including a terminal for reading from and writing to an electronic token which has an onboard data processing capability. Such a token is often in the form of an elongate card and may be termed a "Smart Card". The terminal may be a stand alone unit with which data held within the token can be read or altered or alternatively the terminal may be connected by a remote or local link to an external host such as a bank's computer.

2. Background Information

Systems of this type have become well established in recent years and generally take the form of a terminal fixed at a certain place, such as a bank, and a token which is portable and is issued to an individual who carries the token around and brings it to the terminal when a transaction is deemed necessary. The system may be of the contact type in which the token must physically touch the terminal in order for communication to be established or may be of the contactless type which utilises for example, inductive coupling. This invention is related to the latter-mentioned type of coupling.

It is evident that in this type of system, a terminal is in communication with a token only for short periods of time but it is important that, when a token is brought towards the terminal, the terminal recognises this and is able relatively quickly to establish communication. It is preferable that the user does not have to 'switch on' the terminal each time he wants to use it. Thus, in inductively coupled systems which use a carrier wave transmitted from the terminal to the token the terminal may be permanently energised so that when the token is brought towards the terminal it is immediately powered up. In an alternative form as described in GB 2208025 A, the terminal is arranged to transmit the carrier signal at a relatively low stand-by level and, after detecting a token, to raise the level of the carrier to a higher level equal to the operating level. Since the carrier signal is permanently on, albeit at a low level, the terminal still consumes a considerable amount of power when in its 'dormant' mode.

The present invention arose from a need to reduce still further this power requirement.

SUMMARY OF THE INVENTION

According to the present invention, there is provided a transaction system comprising a first body having stand-by and operative modes, said first body being arranged, in said operative mode, for communication inductively with a second body to effect a transaction, said first body including generator means for generating and transmitting radio frequency signals, the signals, in said stand-by mode, being in the form of discrete radio frequency pulses, detection means in said first body for detecting the amplitude of said transmitted signals and for determining whether the detected amplitude, within a predetermined period of time coincident with but not greater than the pulse duration, is above (indicating the absence of a second body) or below (indicating the proximity of a second body) a threshold value, and for causing said generator means respectively to switch from stand-by mode to operative mode whereby communication with the second body is enabled, or from operative mode to stand-by mode whereby communication with a second body is disabled.

Thus, a system embodying the invention pulses its carrier r.f. signal, and, if a token is brought into the proximity of the terminal then the detected r.f. level in that particular pulse will not exceed the threshold value since the token will draw power and thus reduce the level of the r.f. field. Once the token is sensed then the r.f. may be left on permanently and a transaction allowed to be conducted. When the token is subsequently removed then the detected r.f. level will rise again since less current is being drawn and hence will exceed the threshold, thus cutting off the permanent r.f. signal and reverting to pulsed, stand-by mode.

In an alternative system, once a token is detected as described above, the pulse of r.f. is allowed to complete and the pulse cycle allowed to continue, but means are provided in the system for noting that the token is present and awaiting a signal from an external device, such as a host computer for example, to switch the r.f. on permanently. This may be useful in some particular applications.

Preferably, a pulse is transmitted once every second or once every 100 mS depending upon whether, respectively, low power consumption or quick response is required. The pulse width is typically of 150 micro seconds.

In a preferred embodiment, the analog circuitry in the terminal, which circuitry typically includes signal processing circuitry for processing data from the token to the terminal, is first powered up, typically for a period of 10 mS. In the last 0.15 mS of this 10 mS time period, the r.f. pulse is generated. This is because the analog circuitry requires a short time to settle down but must be settled to detect an 'answer to reset' character from a token, which happens a short period after the token is powered up by the r.f. from the terminal.

Embodiments of the invention will now be described by way of example only, with reference to the accompanying drawings in which:

DETAILED DESCRIPTION OF THE PREFERRED EMBODIMENTS

Figure 1:
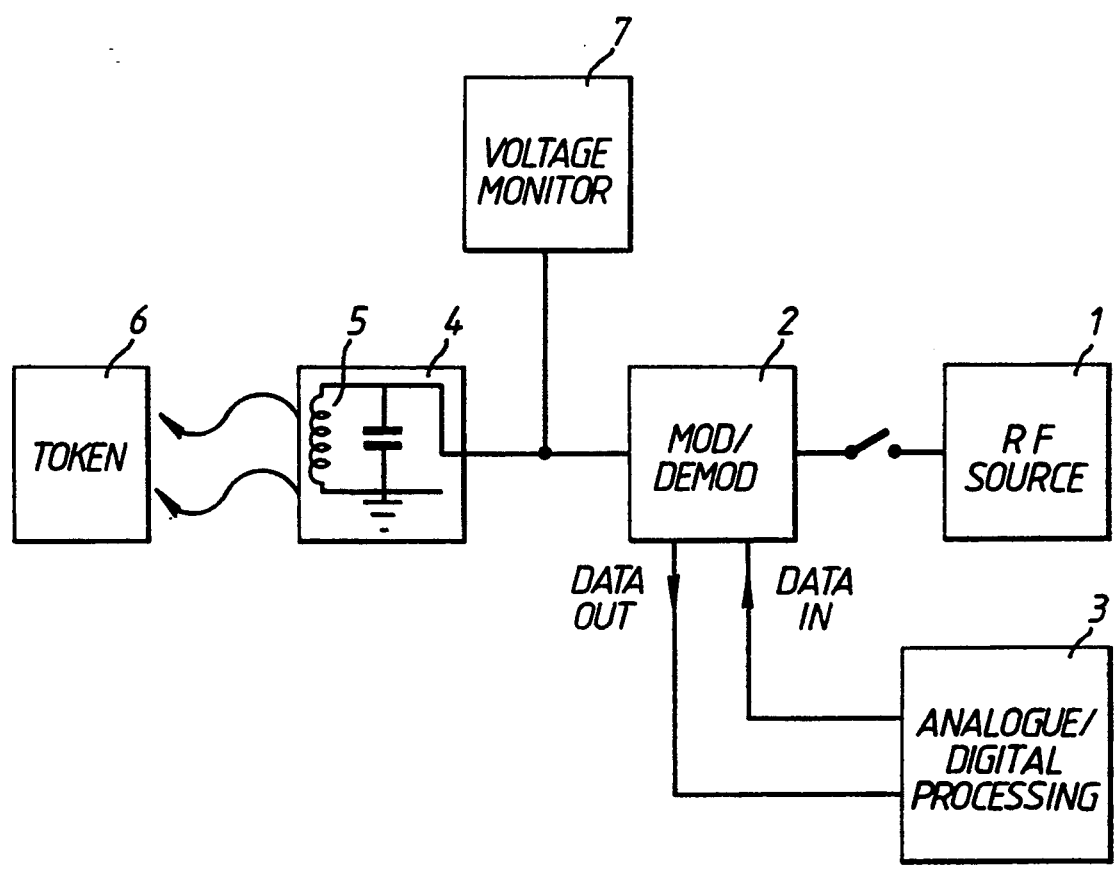
FIG. 1 shows schematically the elements of a read/write terminal.

Referring to FIG. 1, there is shown in block form elements of a terminal which, in an operative mode of the terminal, is suitable for interaction, by means of inductive coupling, with an electronic token comprising processing means and memory means. The terminal is of the type which, in a standby mode transmits pulses of an unmodulated r.f. carrier wave and, in the operative mode, transmits data thereto by means of modulation of the r.f. carrier signal. In a typical example, data to be transmitted from the terminal to the token is transmitted by frequency modulation of the carrier wave and data from the token to the terminal is transmitted by a level or amplitude modulation of that same wave. The terminal comprises an r.f. source 1, typically of 300 kHz which may be switched on and off or pulsed by apparatus which is further described below with reference to FIG. 2. This carrier signal is fed to modulation and/or demodulation circuitry 2 where either an FM modulation corresponding to data to be transmitted is applied to the carrier or amplitude modulation from data received is detected. The data is passed to or from analog and/or digital processing circuitry 3. The modulated signal is passed to a tuned circuit 4 which includes an inductive loop 5. This generates a varying magnetic field which is detected by a similar loop on a token 6. A voltage monitoring circuit 7 monitors the signal at the tuned circuit 4 and is used to detect whether a token is present or not since a token, by drawing power, will lower the level of the r.f. signal. A switch 8 is shown schematically as a control switch for the r.f source.

Figure 2:
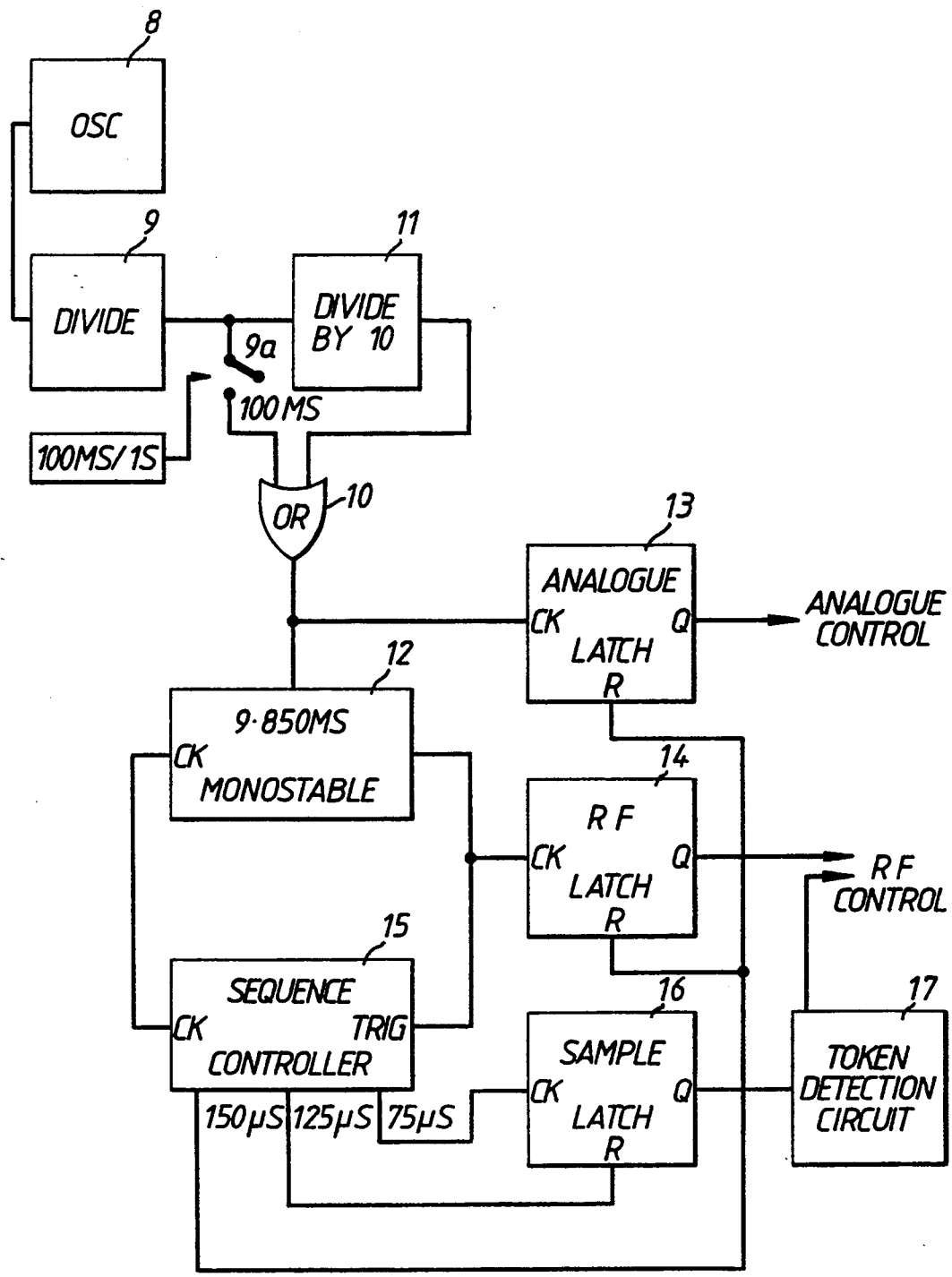
FIG. 2 shows schematically elements of a terminal in accordance with the present invention.

Referring now to FIG. 2, there is shown a system by which the output of the terminal can be controlled. The system comprises an oscillator 18 such as a 12 MHz crystal oscillator which is fed through a suitable divider 9 to produce a pulse once every 100 mS which pulse is fed through a switch 9a to one input of an OR gate 10. The output from divider 9 is also fed to a Divide-by-Ten unit 11 to produce a pulse at a frequency of one second which is fed to a second input of OR gate 10. An output from the OR gate is fed into a monostable 12 designed to switch states after a period of 9.850 mS. An output from the OR gate 10 is also used to initiate a latch 13 which is used to control the analog circuitry (not explicitly shown) in the terminal and is accordingly termed an analog latch. The analog circuitry is thus turned on once every 100 mS or 1 second depending upon whether the 100 mS signal is switched into the OR gate by switch 9a.

After a period of 9.85 mS monostable 12 is arranged to switch state and to feed a clock signal to an r.f. latch 14 which serves to actuate the r.f. source 1 of FIG. 1.

Simultaneously, a sequence controller 15 is triggered by a signal from monostable 12. The sequence controller is designed in this embodiment to give three outputs at different time periods after triggering. After a period of 0.075 mS a signal is fed into the clock input of a sample latch 16 which serves to actuate a token detection circuit 17; this is equivalent to the voltage monitor 7 of FIG. 1 and essentially detects whether a token is present by monitoring the voltage on the r.f. line using standard techniques. After a further period of 0.05 mS, i.e. 0.125 mS from triggering, the sample latch is reset and sampling is ceased. When 0.025 mS later (0.15 mS after triggering), the r.f. and analog latches 14 and 13 are reset thus switching off the r.f. and analog signals. Hence, the analog circuit has been 'turned on' for 10 mS and the r.f. has been 'turned on' for 0.15 mS. A threshold value is set, above which the r.f. level will rise when a token is not present, but which is of such value that the presence of a token within a chosen range causes the r.f. level not to exceed the threshold value. The value is easily determinable, depending upon the application, component values, power requirements, etc.

The above assumes that a token is not detected during the 0.050 mS sample period. If a token is detected then the system may operate in two alternative powering up modes. In a first mode, when a token is detected by the pulse not exceeding a threshold value within a fixed time limit (usually smaller than the pulse duration) then the r.f. source is not switched off. Instead the r.f. is left permanently on so that contact with the token can be established and a transaction, such as a financial transaction, conducted. The analog circuitry is also left on during this period. The manner of conducting a transaction does not form part of this invention and is omitted herein.

Once the token is removed then the token detection circuit 17 which has been left permanently on, in addition to the r.f. and analog circuits, senses that the level of the r.f. increases above the threshold value and thus turns the r.f. and analog signals off. The system then reverts to its pulsing mode and pulses the analog and r.f. circuits every 100 mS or 1 second as selected. A delay may be imparted into the system such that once it has been detected that the token has been removed the r.f. and analog circuits are turned off after a fixed delay period. This process is shown more clearly in FIG. 3 where A represents the internal clock frequency of 12.218 MHz. Waveform B is for a system where the pulse is initiated once every second and shows a pulse repeated every one second. Waveform C shows how the analog circuitry is switched on for a period of 10 mS when a pulse is output from OR gate 10. Waveform D shows how the r.f. source is switched on for the last 150 microseconds of this period. Some 0.075 mS later the token sample or detection circuit 17 is switched on as shown at E, for a period of 0.05 mS. If a token is introduced at any time then the token detect line will detect it and thus, as shown in the second portion of FIG. 3, will leave the analog, r.f. and token detect lines open. Removal of the token is detected by the token detection circuit which, after a delay of 50 mS in this example switches off the analog, r.f and token sample circuitry. Pulsing is then re-established.

Figure 3:
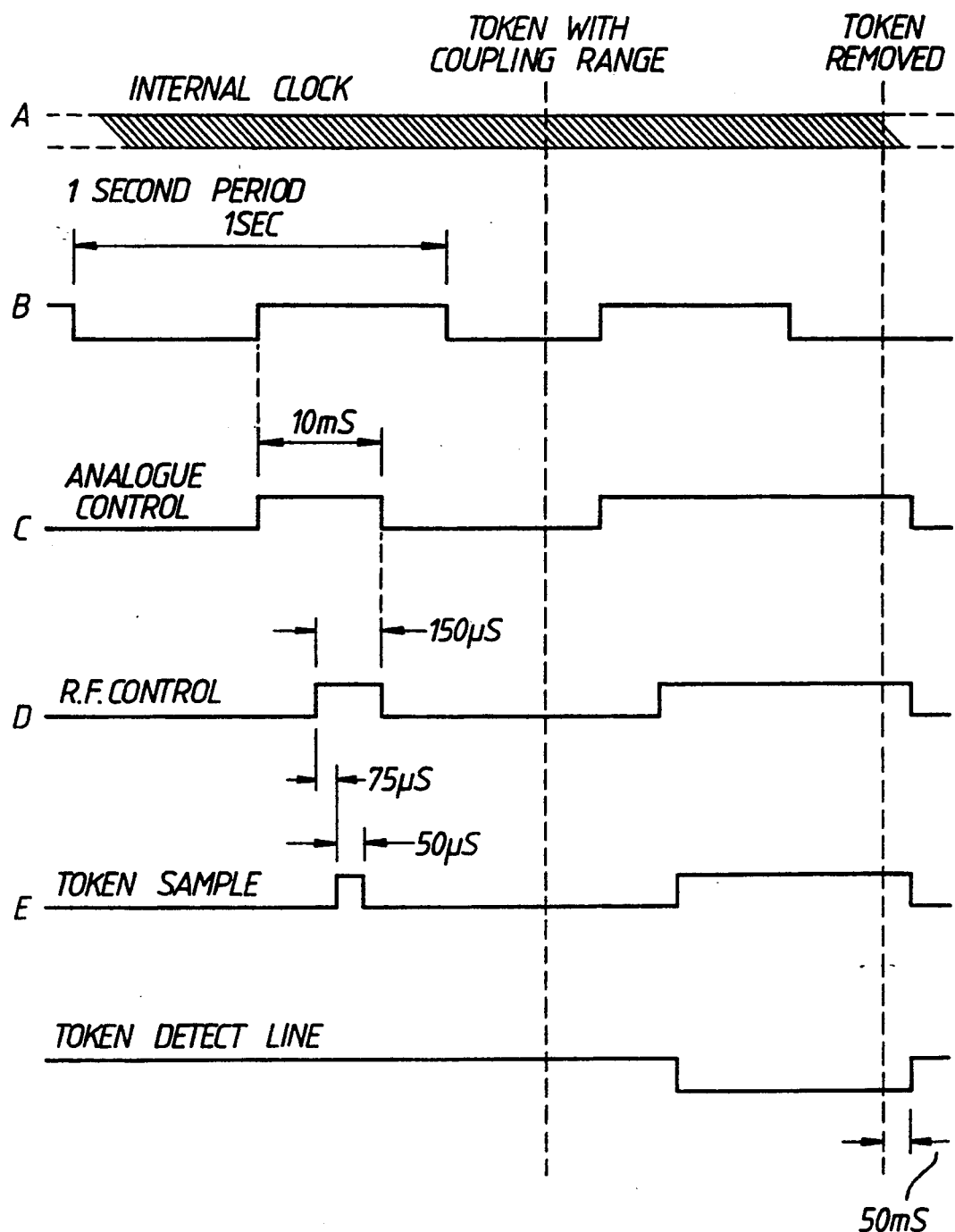
FIGS. 3 and 4 are waveform diagrams.
Figure 4:
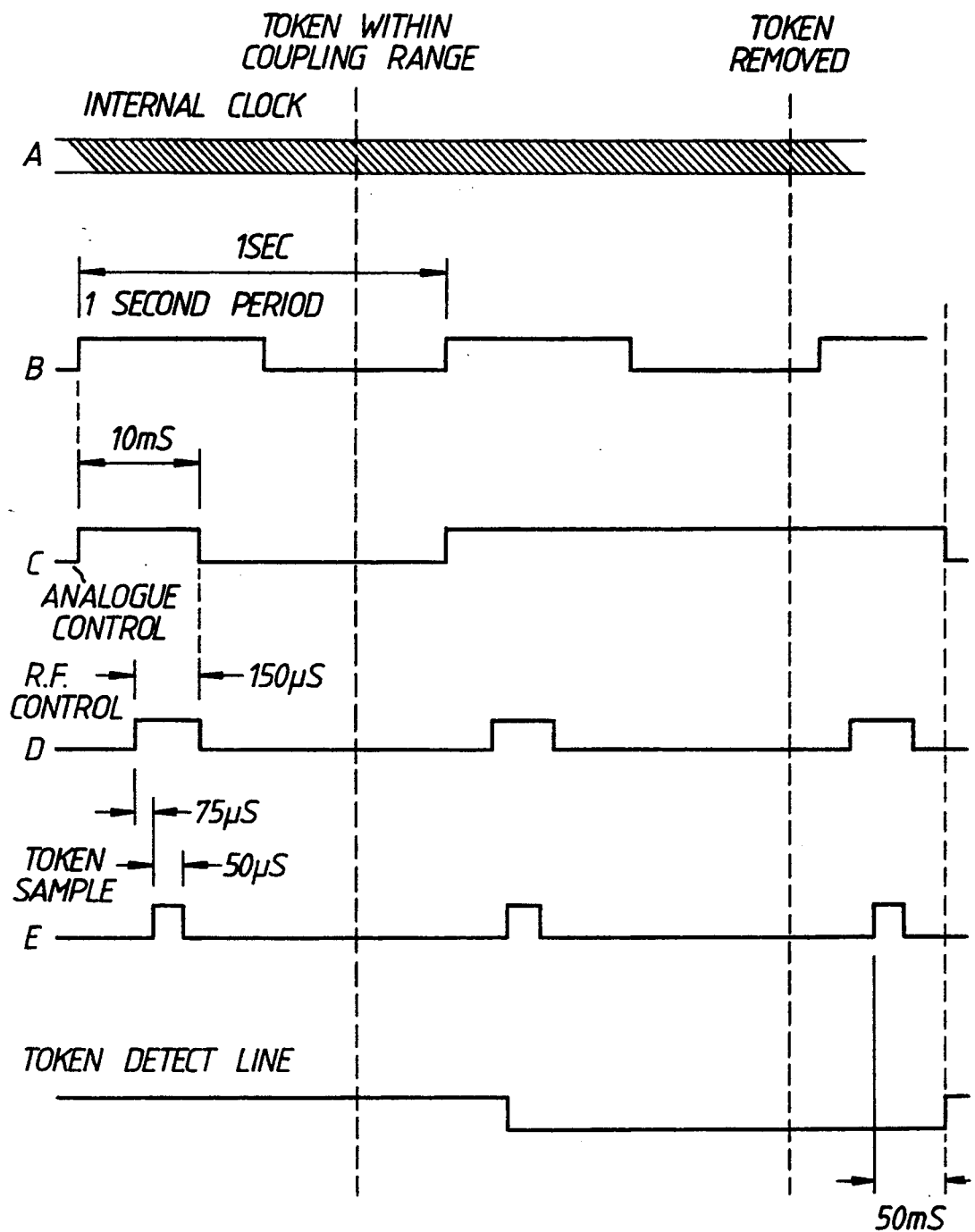

It should be noted that the waveforms in FIG. 3 and FIG. 4 are not to scale.

FIG. 4 shows an alternative mode in which the first part, when a token is not present, is identical to that in the first mode. However, as shown in the second part of FIG. 4, once a token is brought into the proximity of the terminal then the token detection circuit notes this but, instead of leaving the r.f. permanently on it allows it to be switched off at the end of its pulse period of 150 microseconds. The analog circuitry is however left on permanently and also a flag is set in the system so that an external device, such as a host computer, can give a message to turn the r.f. on. The system is thus seen as being 'primed' for operation once a token is detected but operation is not actually initiated until an external device instigates it. This system may have advantages in certain applications. Upon removal of the token from proximity of the terminal the token detect line detects this removal, and, after a 50 mS delay resets the analog control to off and enables pulsing to begin again.

Although the inductively-coupled bodies have been termed terminal and token in this specification, the invention is not limited in this regard and is suitable for use between any two bodies which communicate by means of inductive or other contactless coupling.

I claim:

1. A transaction system comprising a first body having stand-by and operative modes, said first body being arranged, in said operative mode, for communication inductively with a second body to effect a transaction, said first body including timing means, operable in said stand-by mode, for energizing circuitry of said first body at predetermined intervals each of a first duration of time, said circuitry including generator means for generating and transmitting radio frequency signals of a second duration less than said first duration, said circuitry also including detection means, said detection means being operable for a third duration of time, the third duration of time being coincident with but not greater than said second period of time, said detection means serving to detect the amplitude of the transmitted radio frequency signals and to cause said first body to switch from said stand-by to said operative mode if the detected amplitude is below (indicating the proximity of a second body) a threshold value whereby communication with said detected second body is enabled.

2. A transaction system as claimed in claim 1 wherein the first body is a read/write terminal and the second body is a portable token having onboard data processing capability.

3. A transaction system as claimed in claim 1 further including indicator means for indicating that the second body is in inductive proximity and wherein the indicator means comprises further means for enabling the r.f. signal to be left permanently on until removal of the second body is detected, whereupon stand-by transmission of the r.f. in the form of discrete pulses is re-established.

4. A transaction system as claimed in claim 3 wherein the indicator means comprises further indicator means for setting a flag or other indicator which is detectable by an external host to switch the generator means to transmit r.f. continuously.

5. A transaction system as claimed in claim 1 wherein said circuitry in said first body includes analog circuitry, said analog circuitry being energized for the whole of each said first duration of time until the second body is detected, at which point said analog circuitry is left permanently on until removal of the second body, said analog circuitry being energized for a period of time prior to commencement of each said second duration and during the same such that the analog circuitry is fully powered up before the transmission of each r.f. signal.

6. A transaction system as claimed in claim 5 wherein the analog circuitry within first body is actuated for periods of 10 mS and the r.f. pulse is actuated during the final 0.15 mS of the 10 mS period.

7. A transaction system as claimed claim 1 wherein, in the stand-by mode, the pulse frequency of the discrete pulses is selected from a plurality of values.

8. A transaction system as claimed in claim 7 wherein the values are one second and 100 mS.

9. A transaction system as claimed in claim 1 wherein the r.f. pulse duration is 0.15 mS.

* * * * *